United States Patent
Wu

(10) Patent No.: US 9,561,624 B1
(45) Date of Patent: Feb. 7, 2017

(54) LASER 3D PRINTER

(71) Applicant: Jiangsu Rich-Opto Technology Co., Ltd., Zhenjiang, Jiangsu (CN)

(72) Inventor: Yin Wu, Zhenjiang (CN)

(73) Assignee: Jiangsu Rich-Opto Technology Co., Ltd., Zhenjiang (CN)

( * ) Notice: Subject to any disclaimer, the term of this patent is extended or adjusted under 35 U.S.C. 154(b) by 0 days.

(21) Appl. No.: 15/227,201

(22) Filed: Aug. 3, 2016

(30) Foreign Application Priority Data

May 19, 2016 (CN) .......................... 2016 1 0334994

(51) Int. Cl.
*B29C 67/00* (2006.01)
*B33Y 30/00* (2015.01)
*B33Y 50/02* (2015.01)

(52) U.S. Cl.
CPC ....... *B29C 67/0066* (2013.01); *B29C 67/0088* (2013.01); *B33Y 30/00* (2014.12); *B33Y 50/02* (2014.12)

(58) Field of Classification Search
CPC . B29C 67/0066; B29C 67/0051; B33Y 50/02; B33Y 30/00
USPC ..... 264/401, 112, 308, 494; 425/375, 174.4, 425/135
See application file for complete search history.

(56) References Cited

U.S. PATENT DOCUMENTS

| | | | |
|---|---|---|---|
| 5,248,456 A * | 9/1993 | Evans, Jr. ........... | B29C 67/0066 118/423 |
| 2004/0004303 A1 * | 1/2004 | Iskra ..................... | B22F 3/1055 264/109 |
| 2007/0075461 A1 * | 4/2007 | Hunter ................... | B29B 13/02 264/401 |
| 2010/0247703 A1 * | 9/2010 | Shi ....................... | B29C 67/0081 425/375 |
| 2012/0043312 A1 * | 2/2012 | Lee ........................ | H05B 6/062 219/622 |
| 2013/0052292 A1 * | 2/2013 | Busato ................ | B29C 67/0085 425/174.4 |
| 2014/0265034 A1 * | 9/2014 | Dudley ............... | B29C 67/0085 264/401 |
| 2015/0064298 A1 * | 3/2015 | Syao ................... | B29C 67/0062 425/169 |
| 2015/0343533 A1 * | 12/2015 | Park ........................ | B28B 7/465 425/78 |
| 2016/0136890 A1 * | 5/2016 | Castanon ............ | B29C 67/0077 425/174.4 |

FOREIGN PATENT DOCUMENTS

CN 104228069 A 12/2014

* cited by examiner

*Primary Examiner* — Nahida Sultana
(74) *Attorney, Agent, or Firm* — Feng Shan; SZDC Law P.C.

(57) ABSTRACT

A laser 3D printer includes a printer stand, a resin tank, a loading plate, a lifting module, and a rapid prototyping module. A front cover and a back cover are connected to the front end and back end of the printer stand, respectively. A work surface of the printer stand includes a resin tank installation opening. The resin tank is installed in the resin tank installation opening. The lifting module is provided at the top edge of the printer stand. The front of the lifting module is connected to the loading plate. The loading plate is located on top of the center of the resin tank.

10 Claims, 10 Drawing Sheets

LASER 3D PRINTER

The present application claims the benefit of Chinese Application No. 201610334994.X, filed on May 19, 2016, which is incorporated by reference for all purposes as if fully set forth herein.

TECHNICAL FIELD

The present invention relates to the field of 3D printing, and more particularly to a laser 3D printer.

BACKGROUND 3D printing is a technology based on mathematical model files, using adhesive materials, such as special wax, powdered metal or plastic materials, applying a layer-by-layer printing method to construct an object. It is different from a traditional material construction method, and is a new three dimensional layer-by-layer printing method via gradually adding materials. With the rapid development of 3D printing technology, laser technology, due to its speed and accuracy, has been widely applied to 3D printing as the source of energy. Specifically, photosensitive resin stereolithography apparatus (SLA) has dominated the market. SLA uses the principle of three dimensional sculpture, a resin tank is filled with liquid photosensitive resin, and the photosensitive resin is cured after a fast UV laser irradiation to directly obtain a cured resin or similar plastic product.

The design and optimization of the optical system of a laser 3D printer directly affects the printing precision, speed, and stability. In existing optical systems, the laser often reaches the resin tank after multiple reflections. When the laser is reflected, a part of the laser is lost, resulting in reduced laser intensity. Further, multiple reflections raised the requirements for precisely placing the printer parts inside a 3D printer. For example, CN104228068A discloses a rapid SLA 3D printer and a printing method using thereof.

In order to achieve the best focus, a reflection mirror is placed directly underneath the resin tank. 3D printing can be carried out by reflecting the laser via the reflection mirror. In addition, to achieve the best optical path, operators will manually adjust the location of printer parts. It not only is time consuming, but also affects printing quality, not meeting printing precision, speed, and, and product stability requirements. Especially for high-end applications, such as modeling jewelry, dental tooth mold, prototype models, the printing needs cannot be met.

SUMMARY OF THE INVENTION

Technical problem to be solved by the present invention is to provide a stale, high speed, and high precision laser 3D printer.

The laser 3D printer of the present invention includes a printer stand, a resin tank, a loading plate, a lifting module, and a rapid prototyping module. A front cover and a back cover are connected to the front end and back end of the printer stand, respectively. A work surface of the printer stand includes a resin tank installation opening. The resin tank is installed in the resin tank installation opening. The lifting module is provided at the top edge of the printer stand. The front of the lifting module is connected to the loading plate. The loading plate is located on top of the center of the resin tank. Side walls of the front cover include ventilation holes. Fans are installed on an inner wall of the back cover. An operation display unit and an on-off switch is installed on the front cover. A plexiglass plate is installed on the resin tank installation opening. A rectangular resin tank heating frame surrounds the resin tank installation opening. Top of the resin tank heating frame includes a plurality of first magnets. The resin tank is located on the resin tank heating frame. Bottom of the resin tank includes a plurality of second magnets. Positions of the second magnets correspond to the positions of the first magnets. A plurality of mounting rods extends horizontally and outwardly from edges of the resin tank. A plurality of bar mounts extends from edges of the resin tank heating frame. The bar mounts include "L" shaped recesses on top, which correspond to the mounting rods. The mounting rods are inserted from ends of the bar mounts into the "L" shaped recesses, and the rein tank is pushed along the "L" shaped recesses until the first magnets attract the second magnets due to magnetic interaction. A rapid prototyping module is mounted to a bottom plate of the printer stand. The rapid prototyping module includes a light outlet aligned with a center of the resin tank. A hood, made of opaque material, is located between the light outlet and the resin tank. A servo control mounting plate and a power supply mounting plate are attached vertically to left side and right side of the printer stand, respectively.

In another embodiment, the laser 3D printer of the present invention further includes ear hooks and mounting slots. The ear hooks are located at top and bottom of the sides of the printer stand. The mounting slots are located in the printer stand. The front cover and back cover are inserted into the mounting slots 16 and fixed to the printer stand (1) via screws and the ear hooks.

In another embodiment, the resin tank heating frame has a rectangular shape. Bottom of the resin tank heating frame includes a heating coil and a temperature control. Top of the resin tank heating frame includes a red light emitting diode and a blue light emitting diode. The numbers of the first magnets and the second magnets are four each. The four first magnets are located at four top corners of the resin tank heating frame. The four second magnets are located at four bottom corners of the resin tank.

In another embodiment, the hood is made of opaque material. The top of the hood is connected to the bottom of the resin tank installation opening, and the connection is sealed. A telescopic dust cover connects the hood and the light outlet, and the connections are sealed.

In another embodiment, the laser 3D printer of the present invention further includes a hood. The hood is provided on top of the printer stand. A center of the back of the hood includes a hinge. The hinge connects the hood with the back of the lifting module. The resin tank, the lifting module, and the loading plate are located inside the hood.

In another embodiment, the lifting module includes a mounting plate, a ball screw, a lifting arm, a stepper motor, and linear guides. A top plate is mounted on the top of the mounting plate. An upper limit photoelectric switch is mounted in the inside top of the mounting plate. A zero point photoelectric switch is mounted in the inside bottom of the mounting plate. A lower limit photoelectric switch is mounted blew the zero point photoelectric switch. The ball screw and the linear guides are placed vertically along the inside of the mounting plate. The bottom of the ball screw is connected to an output shaft of the stepper motor via a coupling. The ball screw is provided with a ball screw housing. The back of the lifting arm is connected to the ball screw housing and is slidably connected to the linear guides. Light shielding sheets are provided vertically along the back of the lifting arm. The positions of light shielding sheets correspond to light shielding points of the upper limit photoelectric switch, the zero point photoelectric switch, and the lower limit photoelectric switch. A locking collet is located in the front of the lifting arm.

In another embodiment, a nut bearing frame is mounted in lower inside of the mounting plate. The bottom of the ball screw is located on top of the nut bearing frame. A stepper motor housing is provided below the nut bearing frame. A stepper motor is provided below the stepper motor housing. An encoder is provided below the stepper motor.

In another embodiment, the rapid prototyping module includes a housing, a laser generator, a field lens, a scanning motor driver, an X-scanning motor, and a Y-scanning motor. The housing includes a first housing and a second housing. A first sidewall of the second housing includes a first hole. A second sidewall of the second housing, which corresponds to the first sidewall of the second housing, is an opening. The first housing connects the opening of the second housing. The field lens is located in the first hole. An internal stand is located inside the second housing. The inside of the internal stand includes a cavity. The cavity connects the first hole. A first sidewall of the internal stand includes a second hole. A second sidewall of the internal stand, which is next to the first sidewall of the internal stand, includes a third hole. A sidewall of the second housing that opposite to the third hole includes a motor installation opening. An inside wall of the cavity includes a fourth hole. The position of the fourth hole is opposite to the position of the third hole. The third hole and the first hole are perpendicular to each other. The X-scanning motor is installed in a vertical direction along the outside of the first sidewall of the internal stand. A motor shaft of the X-scanning motor inserts through the second hole into the cavity. An end of the motor shaft of the X-scanning motor connects an X lens. The center of the X lens and the center of the fourth hole are in a same horizontal plane. The Y-scanning motor is installed in a horizontal direction along the outside of the second sidewall of the internal stand. A motor shaft of the Y-scanning motor inserts through the third hole into the cavity. An end of the motor shaft of the Y-scanning motor connects a Y lens. The center of the Y lens is aligned with the center of the first hole. The laser generator is integrally installed inside the fourth hole of the internal stand. The scanning motor driver is stalled inside the second housing.

In another embodiment, the scanning motor driver is an integral combination of an X-scanning motor drive plate, a Y-scanning motor drive plate, and a DA converter.

In another embodiment, the laser generator is a power tunable laser.

Compared with conventional technology, the laser 3D printer of the present invention has the following advantages.

A rapid prototyping module is integral combination of a laser generator, a field lens, an X-scanning motor, and a Y-scanning motor. The entire optical system of the laser 3D printing is a compact modular design, and various components are highly integrated and optimized to match the optical path for a compact modular design. At the same time, the stability and accuracy of the optical path is greatly improved. When assembling a laser 3D printer, one does not need to arrange, analyze, and adjust the laser generator, field lens, scanning motor drive, X-scanning motor, and Y-scanning motor. Instead, one only need to install these components in their corresponding positions, and the laser will be transmitted with the best focus. It is easy to assemble, and saves labor and time. The scanning motor drive sends voltage signals to the X-scanning motor and the Y-scanning motor, and in turn moves X lens and Y lens to conduct optical scan, further ensuring the accuracy and stability of 3D printing. The optical path of the prototyping module optical system of the laser 3D printer of the present invention has an optimized double-seal design. The first housing and the second housing form a large sealed area. The laser generator is sealed in the large sealed area. The internal stand, the X-scanning motor, Y-scanning motor, laser generator, and field lens are integrally sealed to form a small sealed area inside the large sealed area. The double-seal design prevents dust from entering the optical path and extends the working hours of the galvanometer mirror lens and field lens. The hood is located on top of the printer stand. The resin tank, the lifting module, and the loading plate are all located inside the hood to ensure that the 3D printing area above the resin tank is dust free and a favorable external environment for the normal operation of 3D printing. The laser generator is located inside the fourth hole of the internal stand, and this design saves space inside the housing and reduces the size of the housing. The resin tank heating frame is located below the resin tank, and controls the temperature of the resin inside the resin tank based on printing needs to ensure a suitable resin temperature for laser 3D printing and the normal operation of laser 3D printing. The mounting rods and the bar mounts guide and locate the resin tank and the resin tank heating frame. The first magnet and second magnet fix the resin tank and the resin tank heating frame and ensure the accurate position of and the easy removal of the resin tank. The hood, made of opaque material, and the telescopic dust cover are located between the light outlet of the rapid prototyping module and resin tank. The optical path is thus sealed, and the interference with 405 nm laser by the peripheral light is prevented. This design also prevents the resin from dripping to the printer housing during the removal of the resin tank. It also reduces the attenuation of laser intensity during transmission, ensuring the stability of the light path and improving the quality of 3D printing products. The scanning motor drive plates, the laser generator, and the internal stand of the second housing are an integral combination. The heat generated by the scanning motor drive plates and the laser generator is transmitted to the housing via the internal stand. The housing has a large surface area, and can transmit the heat quickly. The inside of the housing includes a temperature control device, and the device achieves automatic temperature control for the parts installed inside the housing via the ventilation holes and fans. The encoder is provided below the stepper motor. By using corresponding closed-loop stepper motor drives and simulating the principal of servo motor, high-performance vector closed-loop control is achieved, and efficient and precise molding is realized.

The following drawings and description will provide further explanation of the laser 3D printer as claimed.

DETAILED DESCRIPTION OF THE ILLUSTRATED EMBODIMENTS

Figure 1:
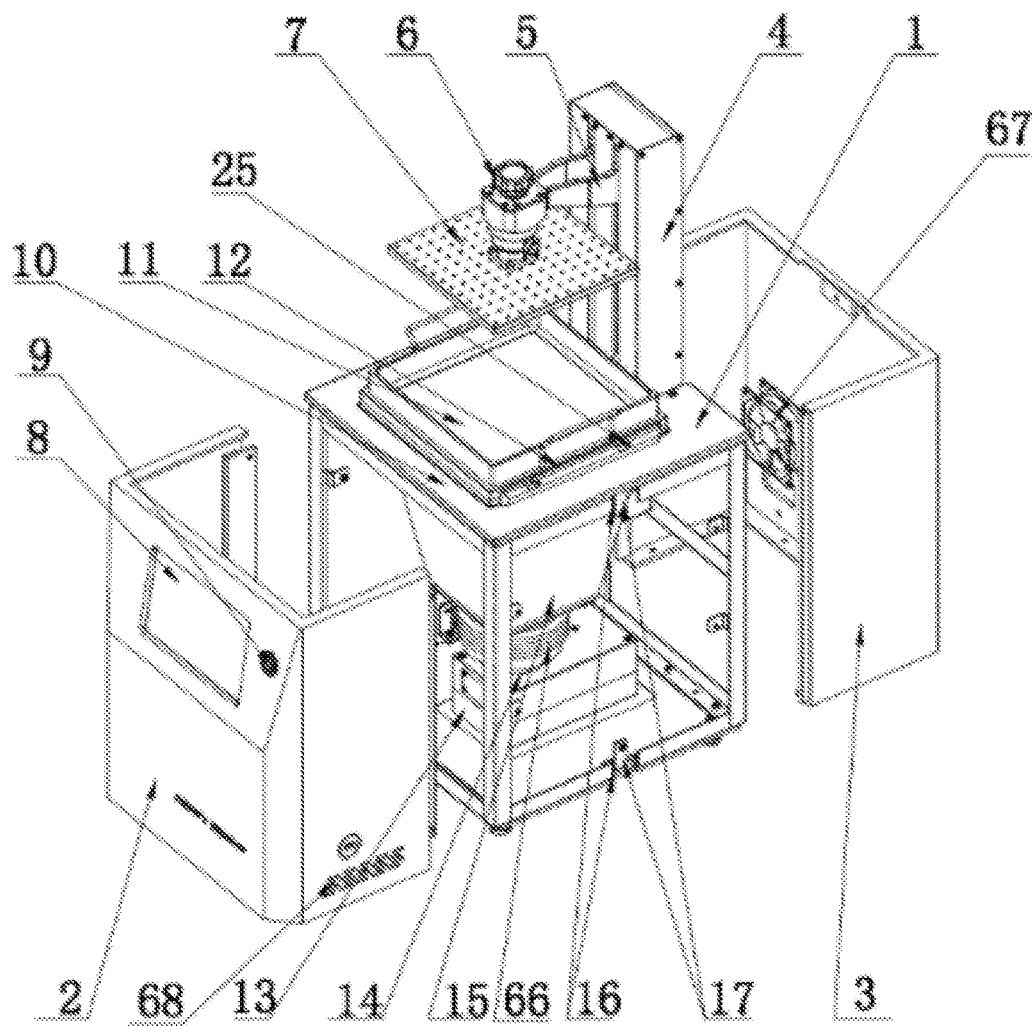
FIG. 1 shows a laser 3D printer in a perspective view.

As shown in FIG. 1, a laser 3D printer includes a printer stand 1, a resin tank 11, a lifting module 4, a loading plate 7, a rapid prototyping module 13 and the hood 15. Front cover 2 and back cover 3 are connected to the front end and back end of the printer stand 1, respectively. Ear hooks 17 are located at the middle portions of top and bottom of the sides of the printer stand 1. The front cover 2 and back cover 3 are inserted into mounting slots 16 of the printer stand 1, and fixed to the printer stand 1 via screws and the ear hooks 17. The front cover 2 includes an operation display unit 8 and on-off switch 9. The lower portions of the side walls of the front cover 2 include ventilation holes 68. Two fans 67 are installed side by side on the center inner wall of the back cover 3. The top center of the printer stand 1 includes a resin tank installation opening which is covered by a plexiglass plate. A rectangular resin tank heating frame 10 surrounds the resin tank installation opening and plexiglass plate.

Figure 2:
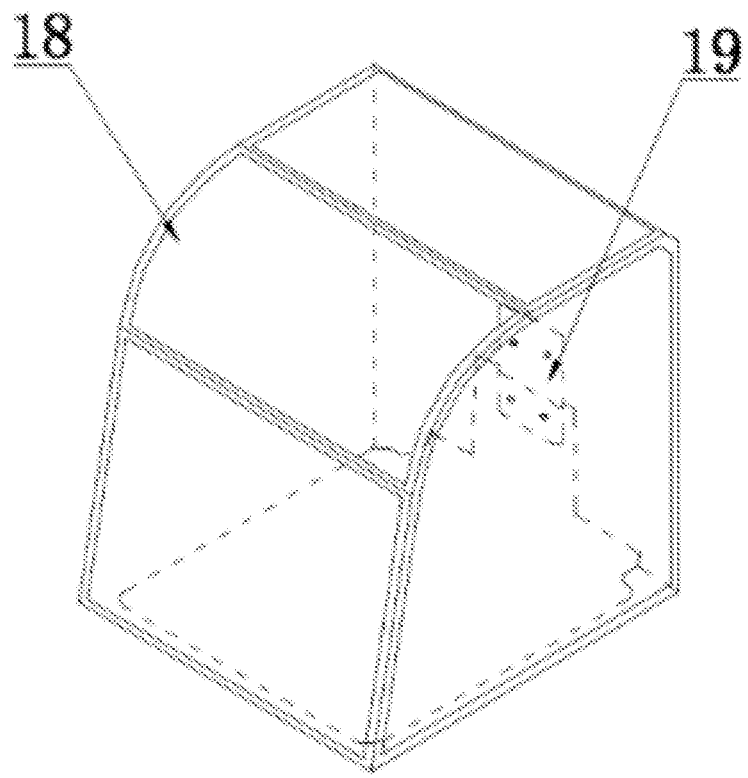
FIG. 2 shows a shield of a laser 3D printer in a perspective view.
Figure 3:
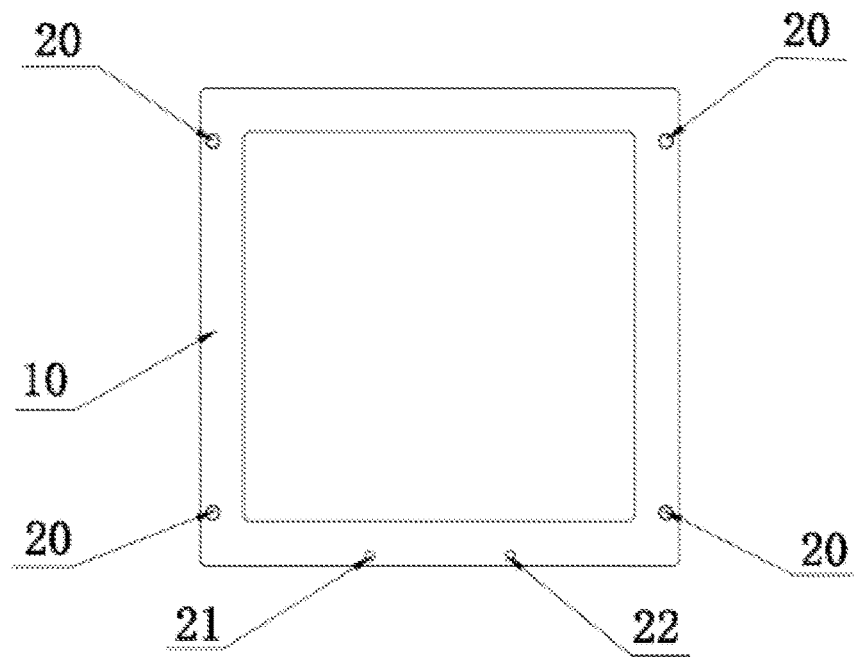
FIG. 3 shows a heating frame of the resin tank of a laser 3D printer in a top view.
Figure 4:
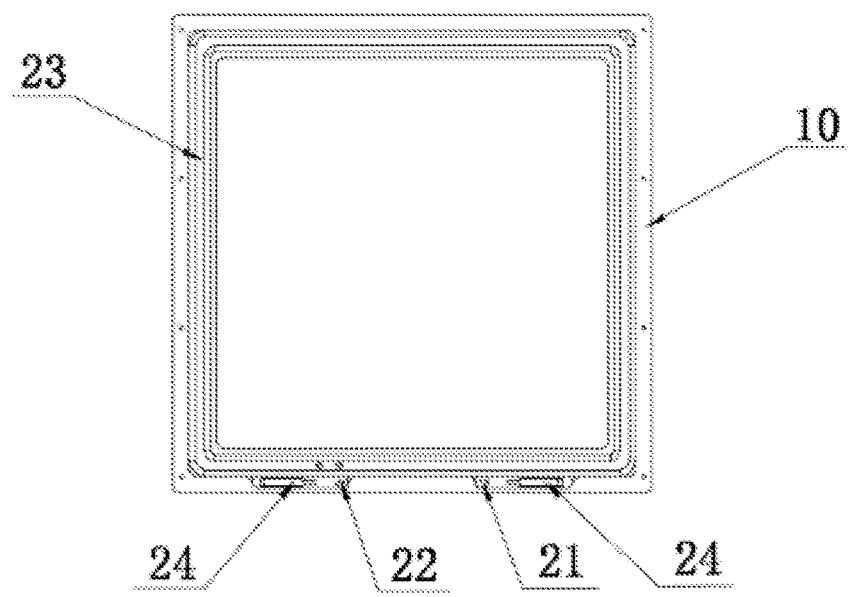
FIG. 4 shows a heating frame of the resin tank of a laser 3D printers in a bottom view.
Figure 5:
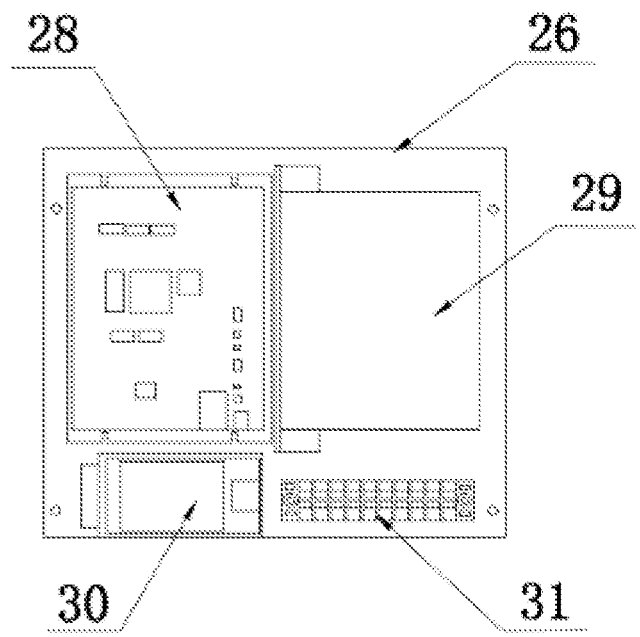
FIG. 5 shows a service control mounting plate of a laser 3D printer in a side view.
Figure 6:
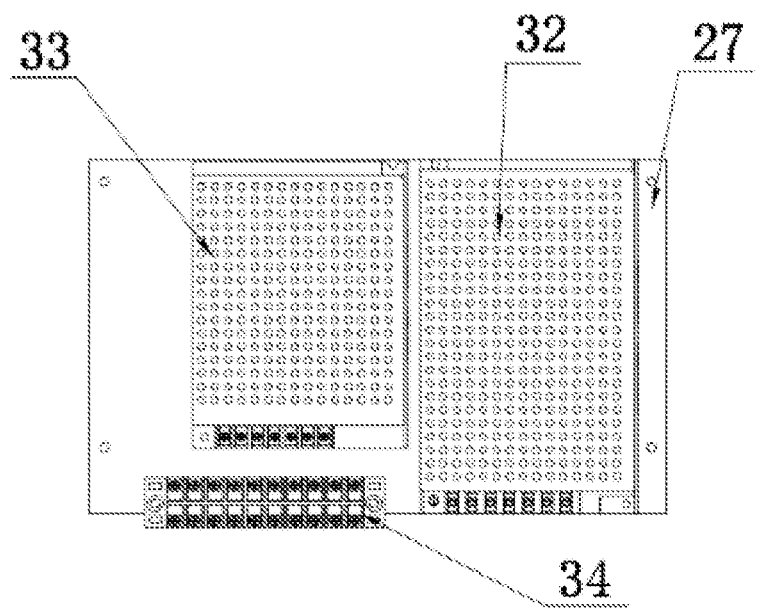
FIG. 6 shows an electric power mounting plate of a laser 3D printer in a side view.

As shown in FIGS. 3 and 4, the bottom of the resin tank heating frame 10 includes heating coil 23 and temperature control 24. The temperature control 24 controls the operation of the heating coil 23. The top of the resin tank heating frame 10 includes a red light emitting diode 21 and a blue light emitting diode 22. The red light emitting diode 21 and the blue light emitting diode 22 indicate different operating status of the heating coil 23. The four first magnets 20 are located at four top corners of the resin tank heating frame 10. Resin tank 11 is located on the resin tank heating frame 10. The four second magnets are located at four bottom corners of the resin tank 11, and correspond to the four first magnets 20. Multiple mounting rods 25 extends horizontally and outwardly from the edges of the resin tank 11. Multiple bar mounts 12 extends from the edges of the resin tank heating frame 10. The bar mounts 12 include "L" shaped recesses on top, which correspond to the mounting rods 25. The mounting rods 25 of the resin tank 11 are inserted from the ends of the bar mounts 12 into the "L" shaped recesses, and the rein tank 11 is pushed along the recesses of the bar mounts 12 until the four first magnets 20 of the resin tank heating frame 10 attract the four second magnets of the resin tank due to magnetic interaction. The resin tank 11 is thus fixed onto the top center of the printer stand 1. A rapid prototyping module 13 is mounted to the center of a bottom plate of the printer stand 1 via screws. The rapid prototyping module 13 includes a light outlet 14 aligned with the center of the resin tank 11. The hood 15, made of opaque material, is located between the light outlet 14 and resin tank 11. The top of the hood 15 is connected to the bottom of the resin tank installation opening, and the connection is sealed. A telescopic dust cover 66 connects the hood 15 and the light outlet 14 of the rapid prototyping module 13, and the connections are also sealed. Because the connections of the hood 15, the telescopic dust cover 66, the rapid prototyping module 13, and the resin tank 11 are sealed, the attenuation of laser intensity in the transmission is reduce. The lifting module 4 is provided in a vertical direction at the top edge of the printer stand 1. The lifting module 4 is connected to the loading plate 7 via a locking collet 6. The loading plate 7 is located on top of the center of the resin tank 11. A hood 18 is provided on top of the printer stand 1. As shown in FIG. 2, the center of the back of the hood 18 includes a hinge 19. The hinge 19 connects the hood 18 with the back of the lifting module 4. The resin tank 11, the lifting module 4, and the loading plate 7 are located inside the hood 18. As shown in FIG. 5, a servo control mounting plate 26 and a power supply mounting plate 27 are attached vertically to left side and right side of the printer stand 1, respectively. The servo control mounting plate 26 include a software control board 28, a stepper motor controller 29, a laser driving power 30, and a first terminal block 31. As shown in FIG. 6, the power supply mounting plate 27 includes a first power supply switch 32, a second power supply switch 33, and a second terminal block 34. The first power supply switch 32 controls galvanometer power, software control board power, monitor power, and stepper motor controller power. The second power supply switch 33 controls resin tank heating power. The operation display unit 8 is a monitor.

Figure 7:
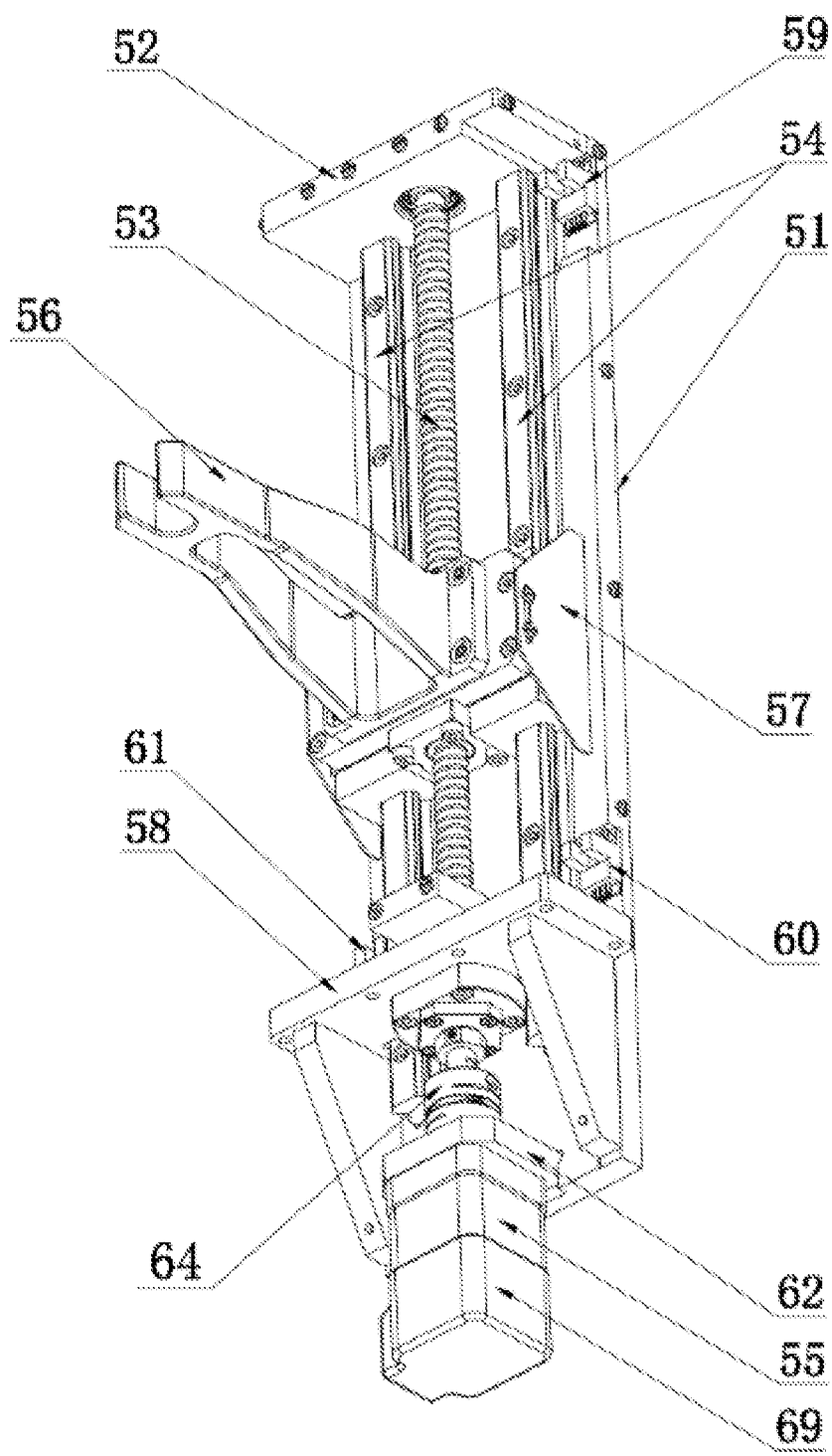
FIG. 7 shows the internal structure of a lifting module of a laser 3D printer.

FIG. 7 shows the internal structure of lifting module 4 of a laser 3D printer. The lifting module 4 includes a mounting plate 51, a ball screw 53, a lifting arm 56, a stepper motor 55, and linear guides 54. A top plate 52 is mounted on the top of the mounting plate 51. An upper limit photoelectric switch 59 is mounted in the inside top of the mounting plate 51. A zero point photoelectric switch 60 is mounted in the inside bottom of the mounting plate 51. A lower limit photoelectric switch 61 is mounted blew the zero point photoelectric switch 60. The ball screw 53 is placed vertically along the inside of the mounting plate 51. A nut bearing frame 58 is mounted in lower inside of the mounting plate 51. The bottom of the ball screw 53 is located on top of the nut bearing frame 58. The top of the ball screw 53 and the top plate 52 are hinged. The ball screw 53 is provided with a ball screw housing. A stepper motor housing 62 is provided below the nut bearing frame 58. A stepper motor 55 is provided below the stepper motor housing 62. The output shaft of the stepper motor 55 is connected to the bottom of the ball screw 53 via a coupling 64. An encoder 69 is provided below the stepper motor 55. Two linear guides 54 are located vertically inside of the mounting plate 51 and along the ball screw 53. The back of the lifting arm 56 is connected to the ball screw housing. The back of the lifting arm 56 is sidably connected to the two linear guides 54. Two light shielding sheets 57 are vertically provided to the sides of the lifting arm 56. The light shielding sheets 57 correspond to the light shielding points of the photoelectric switches. The locking collet 6 is located in the front of the lifting arm 56, and connects the lifting arm 56 and the loading plate 7. During operation, the stepper motor 55 rotates the ball screw 53, and in turn drives the lifting arm 56 along the ball screw 53 and the linear guides 54 up or down. When the lifting arm 56 is moving up to the position of the upper limit photoelectric switch 59, the light shielding sheets 57 shields light of the upper limit photoelectric switch 59, and the upper limit photoelectric switch 59 generates and sends the stepper motor 55 a signal via a controller. After receiving the signal, the stepper motor 55 stops, preventing the lifting arm 56 from continuing moving up. When the lifting arm 56 is moving down to the position of the zero point photoelectric switch 60, the light shielding sheets 57 shields light of the zero point photoelectric switch 60, and the zero point photoelectric switch 60 generates and sends the stepper motor 55 a signal via a controller. After receiving the signal, the stepper motor 55 stops. If the zero point photoelectric switch 60 malfunctions and the lifting arm 56 continues moving down, the light shielding sheets 57 shields light of the lower limit photoelectric switch 61, and the lower limit photoelectric switch 61 generates and sends the stepper motor 55 a signal via a controller. After receiving the signal, the stepper motor 55 stops. The combination of the zero point photoelectric switch 60 and the lower limit photoelectric switch 61 ensures that the lifting arm 56 be stopped when moving down passing the zero point and prevents the damages to the resin tank 11 that may be caused by the moving downward of the lifting arm 56.

Figure 8:
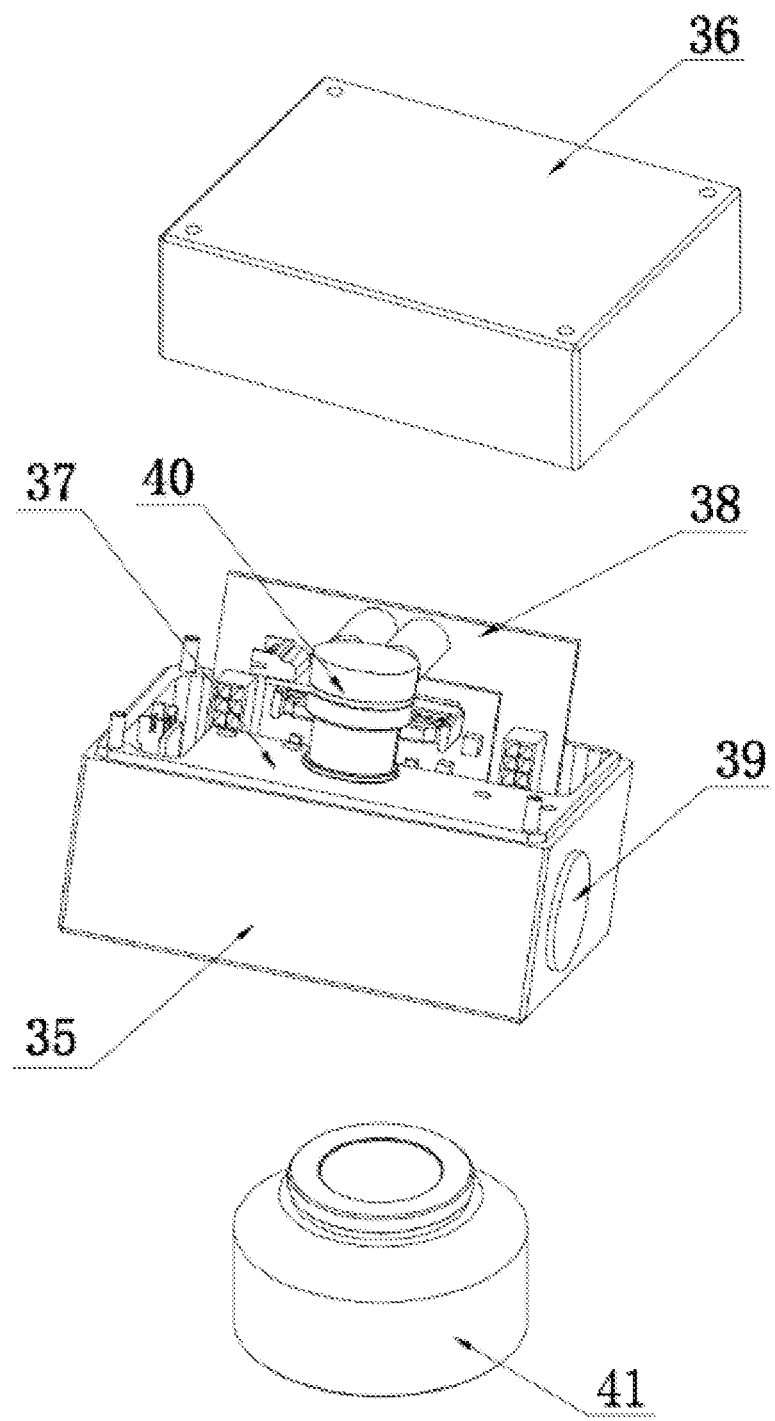
FIG. 8 shows the parts of a rapid prototyping module of a laser 3D printer in a perspective view.
Figure 9:
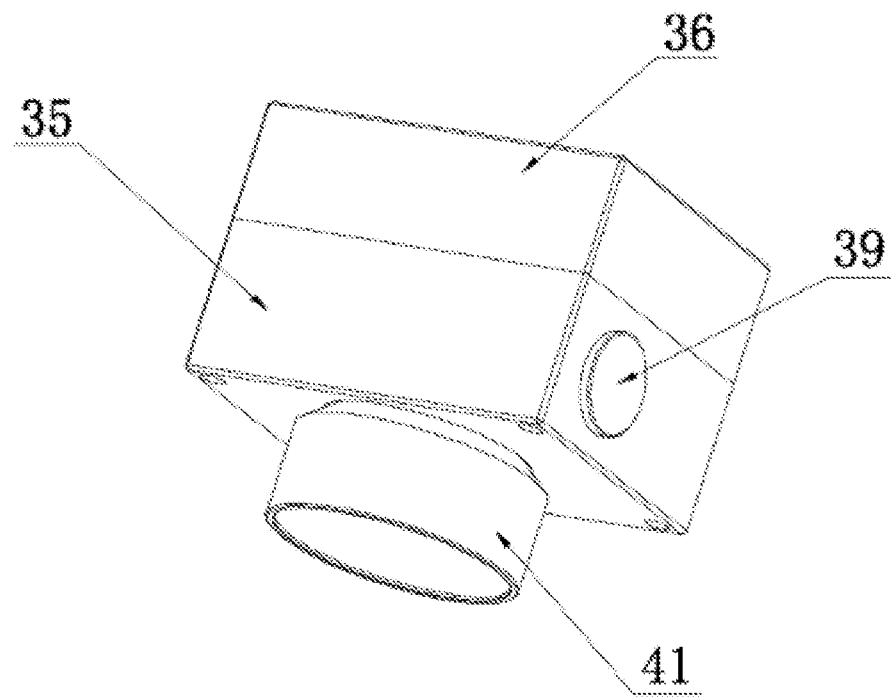
FIG. 9 shows a rapid prototyping module of a laser 3D printer in a bottom perspective view.
Figure 10:
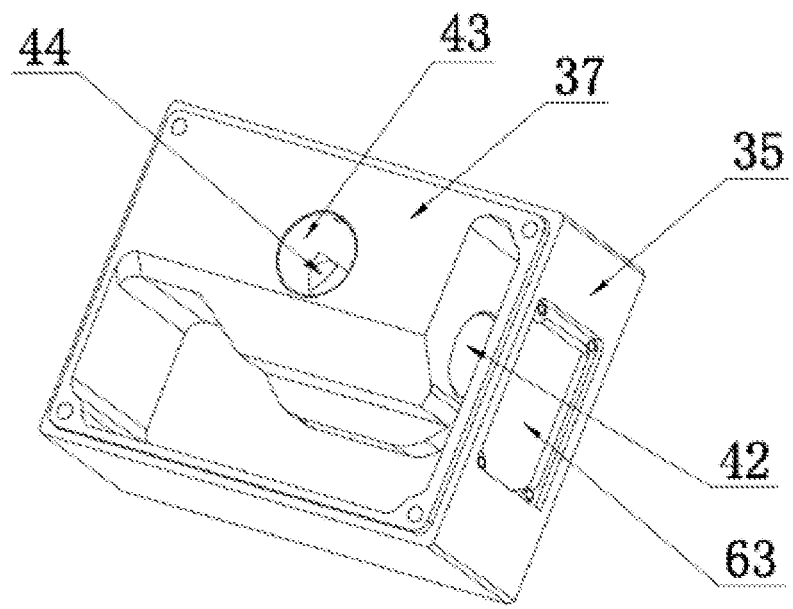
FIG. 10 shows a second case of a rapid prototyping module of a laser 3D printer in a top perspective view.
Figure 11:
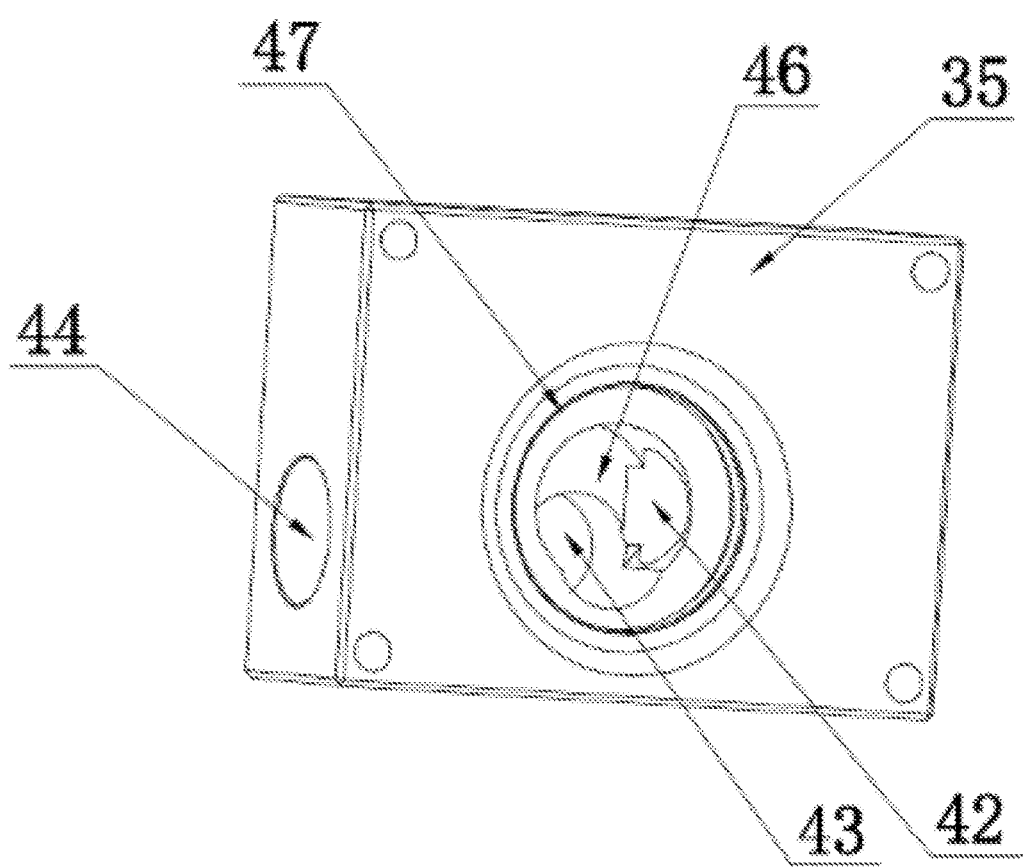
FIG. 11 shows a second case of a rapid prototyping module of a laser 3D printer in a bottom perspective view.
Figure 12:
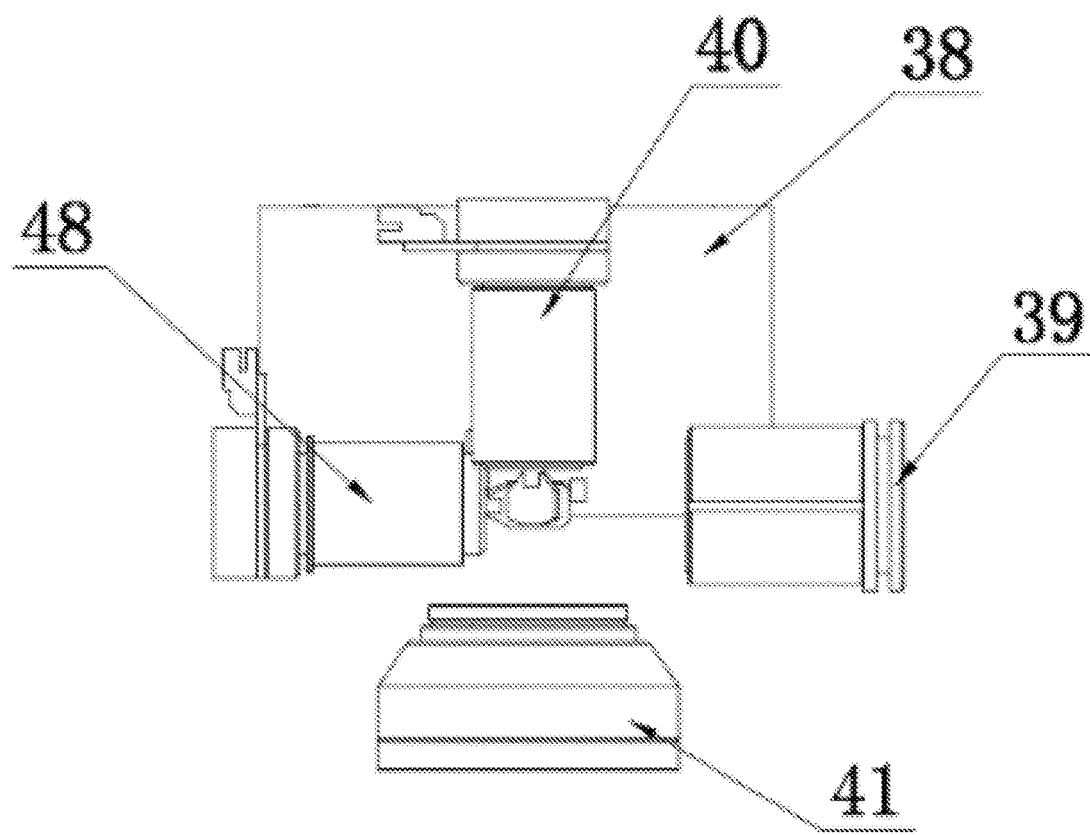
FIG. 12 shows the components of a rapid prototyping module of a laser 3D printer: laser generator, X-scanning motor, Y-scanning motor, field lens, and scanning motor drive.

As shown in FIGS. 8 and 9, the rapid prototyping module 13 includes a housing, a laser generator 39, a field lens 41, a scanning motor driver 38, an X-scanning motor 40, and a Y-scanning motor 48. The housing has a cuboid shape, and includes a first housing 36 and a second housing 35. A first sidewall of the second housing 35 includes a first hole 47. A second sidewall of the second housing 35, which corresponds to the first sidewall of the second housing 35, is an opening. The first housing 36 connects the opening of the second housing 35. The field lens 41 is located outside of the first sidewall of the second housing 35, and a threaded connection terminal of the field lens 41 is connected to the second housing 35 via the first hole 47. As shown in FIGS. 10, 11, and 12, an internal stand 37 is located inside the second housing 35. The edges of the internal stand 37 is integrally connected to the inner wall of the second housing 35. The inside of the internal stand 37 includes a cylindrical cavity 46. The cylindrical cavity 46 connects the first hole 47. A first sidewall of the internal stand 37 includes a second hole 43 which connects the cylindrical cavity 46. A second sidewall of the internal stand 37, which is next to the first sidewall of the internal stand 37, includes a third hole 42 which connects the cylindrical cavity 46. The sidewall of the housing 35 that is opposite to the third hole 42 includes a motor installation opening 63. The inside wall of the cylindrical cavity 46 includes a fourth hole 44. The position of the fourth hole 44 is opposite to the position of the third hole 42. The fourth hole 44 and the second hole 43 are perpendicular to each other. The second hole 43 and the third hole 42 are perpendicular to each other. The third hole 42 and the first hole 47 are perpendicular to each other. The X-scanning motor 40 is installed in a vertical direction along the outside of the first sidewall of the internal stand 37. The motor shaft of the X-scanning motor 40 inserts through the second hole 43 into the cylindrical cavity 46. An end of the motor shaft of the X-scanning motor 40 connects X lens 49. The X lens 49 can swing around the motor shaft of the X-scanning motor 40. The center of the X lens 49 and the center of the fourth hole 44 are in a same horizontal plane. The Y-scanning motor 48 is installed in a horizontal direction along the outside of the second sidewall of the internal stand 37. The motor shaft of the Y-scanning motor 48 inserts through the third hole 42 into the cylindrical cavity 46. An end of the motor shaft of the Y-scanning motor 48 connects Y lens 50. The center of the Y lens 50 is aligned with the center of the first hole 47. The Y lens can swing around the motor shaft of the Y-scanning motor 40. The laser generator 39 is installed inside the fourth hole 44 of the internal stand 37. The outside wall of the laser generator 39 is integrally connected to the inner wall of the fourth hole 44. The scanning motor driver 38, which drives the X-scanning motor and the Y-scanning motor, is also located inside the second housing 35. The scanning motor driver 38 is integral combination of an X-scanning motor drive plate, a Y-scanning motor drive plate, and a DA converter.

In one application of the present invention, the software control board 28 is a PLC controller.

In one application of the present invention, the laser generator 39 is a power tunable laser.

Figure 13:
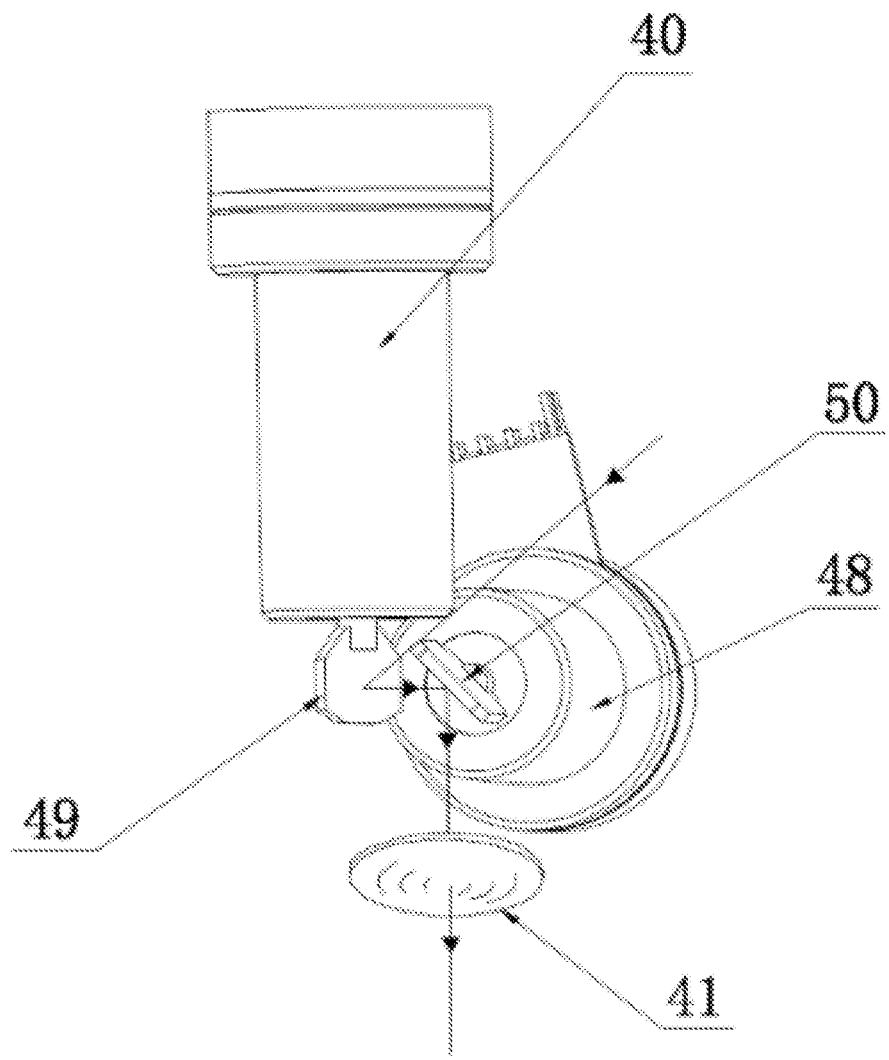
FIG. 13 shows a laser optical path diagram of a laser 3D printer.

In one application of the present invention, the laser optical path is as follows: as shown in FIG. 13, the laser generator 39 sends laser toward the X lens 49. The X lens reflects the laser to the Y lens 50. The Y lens 50 reflects the laser to the field lens 41. The reflected laser passes through the field lens and the plexiglass plate and focuses into the resin tank 11, curing the photo curable resin in the resin tank 11. During a scanning process, the motor shaft of the X-scanning motor 40 and the motor shaft of the Y-scanning motor 48 swing, and in turn move the X lens 49 and the Y lens 50 to conduct an optical scan. Accurate scanning and curing can be then conducted at the focus layer of the resin tank 11 to form each individual printing pattern layer.

In one application of the present invention, the rapid prototyping module 13 is installed on an upper position in a 3D printer. The resin tank 11 is installed below the rapid prototyping module 13. The center of the field lens is aligned with the center of the resin tank 11, resulting in a top-to-bottom 3D printing optical path.

In one application of the present invention, the laser generator 39, field lens 41, X-scanning motor 40 and the Y-scanning motor 48 integrally form the rapid prototyping module 13. The entire optical system of the laser 3D printing is a compact modular design, and various components are highly integrated and optimized to match the optical path for a compact modular design. At the same time, the stability and accuracy of the optical path is greatly improved. When assembling a laser 3D printer, one does not need to arrange, analyze, and adjust the laser generator 39, field lens 41, scanning motor drive 38, X-scanning motor 40, and Y-scanning motor 48. Instead, one only need to install these components in their corresponding positions, and the laser will be transmitted with the best focus. It is easy to assemble, and saves labor and time. The scanning motor drive 38 sends voltage signals to the X-scanning motor 40 and the Y-scanning motor 48, and in turn moves X lens 49 and Y lens 50 to conduct optical scan, further ensuring the accuracy and stability of 3D printing. The optical path of the prototyping module optical system 13 has an optimized double-seal design. The first housing 36 and the second housing 35 form a large sealed area. The laser generator 39 is sealed in the large sealed area. The internal stand 37, the X-scanning motor 40, Y-scanning motor 48, laser generator 39, and field lens 41 are integrally sealed to form a small sealed area inside the large sealed area. The double-seal design prevents dust from entering the optical path and extends the working hours of the galvanometer mirror lens and field lens. The hood 18 is located on top of the printer stand 1. The resin tank 11, the lifting module 4, and the loading plate 7 are all located inside the hood 18 to ensure that the 3D printing area above the resin tank 11 is dust free and a favorable external environment for the normal operation of 3D printing. The laser generator is located inside the fourth hole 44 of the internal stand 37, and this design saves space inside the housing and reduces the size of the housing. The resin tank heating frame 10 is located below the resin tank 11, and controls the temperature of the resin inside the resin tank 11 based on printing needs to ensure a suitable resin temperature for laser 3D printing and the normal operation of laser 3D printing. The mounting rods 25 and the bar mounts 12 guide and locate the resin tank 11 and the resin tank heating frame 10. The first magnet 20 and second magnet fix the resin tank 11 and the resin tank heating frame 10 and ensure the accurate position of and the easy removal of the resin tank 11. The hood 15, made of opaque material, and the telescopic dust cover 66 are located between the light outlet 14 of the rapid prototyping module 13 and resin tank 11. The optical path is thus sealed, and the interference with 405 nm laser by the peripheral light is prevented. This design also prevents the resin from dripping to the printer housing during the removal of the resin tank. It also reduces the attenuation of laser intensity during transmission, ensuring the stability of the light path and improving the quality of 3D printing products. The scanning motor drive plates, the laser generator 39, and the internal stand 37 of the second housing 35 are an integral combination. The heat generated by the scanning motor drive plates and the laser generator 39 is transmitted to the housing via the internal stand 37. The housing has a large surface area, and can transmit the heat quickly. The inside of the housing includes a temperature control device, and the device achieves automatic temperature control for the parts installed inside the housing via the ventilation holes 68 and fans 67. The encoder 69 is provided below the stepper motor 55. By using corresponding closed-loop stepper motor drives and simulating the principal of servo motor, high-performance vector closed-loop control is achieved, and efficient and precise molding is realized. Thus, the present invention improves printing stability, increases printing speed, and achieves high printing accuracy, compared with conventional technology.

Various embodiments described above are merely preferred embodiments of the present invention. The scope of the invention shall not be limited by these embodiment. Without departing from the spirit of the design of the present invention, the modifications and variations of this invention made by those of ordinary skill in the art fall within the scope of the appended claims and their equivalents.

What is claimed is:
1. A laser 3D printer comprising:
a printer stand (1),
a resin tank (11),
a loading plate (7),
a lifting module (4), and
a rapid prototyping module (13),
wherein
a front cover (2) and a back cover (3) are connected to the front end and back end of the printer stand (1), respectively,
a work surface of the printer stand (1) includes a resin tank installation opening,
the resin tank (11) is installed in the resin tank installation opening,
the lifting module (4) is provided at the top edge of the printer stand (1),
the front of the lifting module (4) is connected to the loading plate (7),
the loading plate (7) is located on top of the center of the resin tank (11),
side walls of the front cover (2) include ventilation holes (68),
fans (67) are installed on an inner wall of the back cover (3),
an operation display unit (8) and an on-off switch (9) is installed on the front cover 2,
a plexiglass plate is installed on the resin tank installation opening,
a rectangular resin tank heating frame (10) surrounds the resin tank installation opening,
the top of the resin tank heating frame (10) includes a plurality of first magnets (20),
the resin tank (11) is located on the resin tank heating frame (10),
the bottom of the resin tank (11) includes a plurality of second magnets,
positions of the plurality of second magnets correspond to the positions of the plurality of first magnets (20),
a plurality of mounting rods (25) extends horizontally and outwardly from edges of the resin tank (11),
a plurality of bar mounts (12) extends from edges of the resin tank heating frame (10),
the plurality of bar mounts (12) include "L" shaped recesses on top, which correspond to the mounting rods (25),
the plurality of mounting rods (25) are inserted from ends of the plurality of bar mounts (12) into the "L" shaped recesses, and the rein tank (11) is pushed along the "L" shaped recesses until the plurality of first magnets (20) attract the plurality of second magnets due to magnetic interaction,
the rapid prototyping module (13) is mounted to a bottom plate of the printer stand (1),
the rapid prototyping module (13) includes a light outlet (14) aligned with a center of the resin tank (11),
a hood (15), made of opaque material, is located between the light outlet (14) and the resin tank (11), and
a servo control mounting plate (26) and a power supply mounting plate (27) are attached vertically to left side and right side of the printer stand (1), respectively.

2. The laser 3D printer of claim 1 further comprising: ear hooks (17) and mounting slots (16),
wherein
the ear hooks (17) are located at the top and bottom of the sides of the printer stand (1),
the mounting slots (16) are located in the printer stand (1), and
the front cover (2) and back cover (3) are inserted into the mounting slots (16) and fixed to the printer stand (1) via screws and the ear hooks (17).

3. The laser 3D printer of claim 1,
wherein
the resin tank heating frame (10) has a rectangular shape,
the bottom of the resin tank heating frame (10) includes a heating coil (23) and a temperature control (24),
the top of the resin tank heating frame (10) includes a red light emitting diode (21) and a blue light emitting diode (22),
the number of the plurality of first magnets (20) is four, and the number of the plurality of second magnets is four,
the four first magnets (20) are located at four top corners of the resin tank heating frame (10), and
the four second magnets are located at four bottom corners of the resin tank (11).

4. The laser 3D printer of claim 1,
wherein
the hood (15) is made of opaque material;
the top of the hood (15) is connected to the bottom of the resin tank installation opening, and the connection is sealed; and a telescopic dust cover (66) connects the hood (15) and the light outlet (14), and the connections are sealed.

5. The laser 3D printer of claim 1 further comprising a hood (18),
wherein
the hood (18) is provided on top of the printer stand (1),
a center of the back of the hood 18 includes a hinge (19),
the hinge (19) connects the hood (18) with the back of the lifting module (4), and
the resin tank (11), the lifting module (4), and the loading plate (7) are located inside the hood (18).

6. The laser 3D printer of claim 1,
wherein
the lifting module (4) includes a mounting plate (51), a ball screw (53), a lifting arm (56), a stepper motor (55), and linear guides (54);
a top plate (52) is mounted on the top of the mounting plate (51);
an upper limit photoelectric switch (59) is mounted in the inside top of the mounting plate (51);
a zero point photoelectric switch (60) is mounted in the inside bottom of the mounting plate (51);
a lower limit photoelectric switch (61) is mounted blew the zero point photoelectric switch (60);
the ball screw (53) and the linear guides (54) are placed vertically along the inside of the mounting plate (51);
the bottom of the ball screw (53) is connected to an output shaft of the stepper motor (55) via a coupling (64);
the ball screw (53) is provided with a ball screw housing;
the back of the lifting arm (56) is connected to the ball screw housing and is slidably connected to the linear guides (54);
light shielding sheets (57) are provided vertically along the back of the lifting arm (56);
the positions of the light shielding sheets (57) correspond to light shielding points of the upper limit photoelectric switch (59), the zero point photoelectric switch (60), and the lower limit photoelectric switch (61); and
a locking collet (6) is located in the front of the lifting arm (56).

7. The laser 3D printer of claim 6,
wherein
a nut bearing frame (58) is mounted in lower inside of the mounting plate (51),
the bottom of the ball screw (53) is located on top of the nut bearing frame (58),
a stepper motor housing (62) is provided below the nut bearing frame (58),
a stepper motor (55) is provided below the stepper motor housing (62), and
an encoder (69) is provided below the stepper motor (55).

8. The laser 3D printer of claim 1,
wherein
the rapid prototyping module (13) includes a housing, a laser generator (39), a field lens (41), a scanning motor driver (38), an X-scanning motor (40), and a Y-scanning motor (48);
the housing includes a first housing (36) and a second housing (35);
a first sidewall of the second housing (35) includes a first hole (47);
a second sidewall of the second housing (35), which corresponds to the first sidewall of the second housing (35), is an opening;
the first housing (36) connects the opening of the second housing (35);
the field lens (41) is located in the first hole (47);
an internal stand (37) is located inside the second housing (35);
the inside of the internal stand (37) includes a cavity (46);
the cavity (46) connects the first hole (47);
a first sidewall of the internal stand (37) includes a second hole (43);
a second sidewall of the internal stand (37), which is next to the first sidewall of the internal stand (37), includes a third hole (42);
a sidewall of the second housing (35) that opposite to the third hole (42) includes a motor installation opening (63);
an inside wall of the cavity (46) includes a fourth hole (44);
the position of the fourth hole (44) is opposite to the position of the third hole (42);
the third hole (42) and the first hole (47) are perpendicular to each other;
the X-scanning motor (40) is installed in a vertical direction along the outside of the first sidewall of the internal stand (37);
a motor shaft of the X-scanning motor (40) inserts through the second hole (43) into the cavity (46);
an end of the motor shaft of the X-scanning motor (40) connects an X lens (49);
the center of the X lens (49) and the center of the fourth hole (44) are in a same horizontal plane;
the Y-scanning motor (48) is installed in a horizontal direction along the outside of the second sidewall of the internal stand (37);
a motor shaft of the Y-scanning motor (48) inserts through the third hole (42) into the cavity (46);
an end of the motor shaft of the Y-scanning motor (48) connects a Y lens (50);
the center of the Y lens (50) is aligned with the center of the first hole (47);
the laser generator (39) is integrally installed inside the fourth hole (44) of the internal stand (37); and
the scanning motor driver (38) is stalled inside the second housing (35).

9. The laser 3D printer of claim 8, wherein the scanning motor driver (38) is an integral combination of an X-scanning motor drive plate, a Y-scanning motor drive plate, and a DA converter.

10. The laser 3D printer of claim 8, wherein the laser generator (39) is a power tunable laser.

* * * * *